A. H. LOQVIST.
MILKING MACHINE.
APPLICATION FILED OCT. 28, 1910.
997,569.
Patented July 11, 1911.
3 SHEETS—SHEET 1.
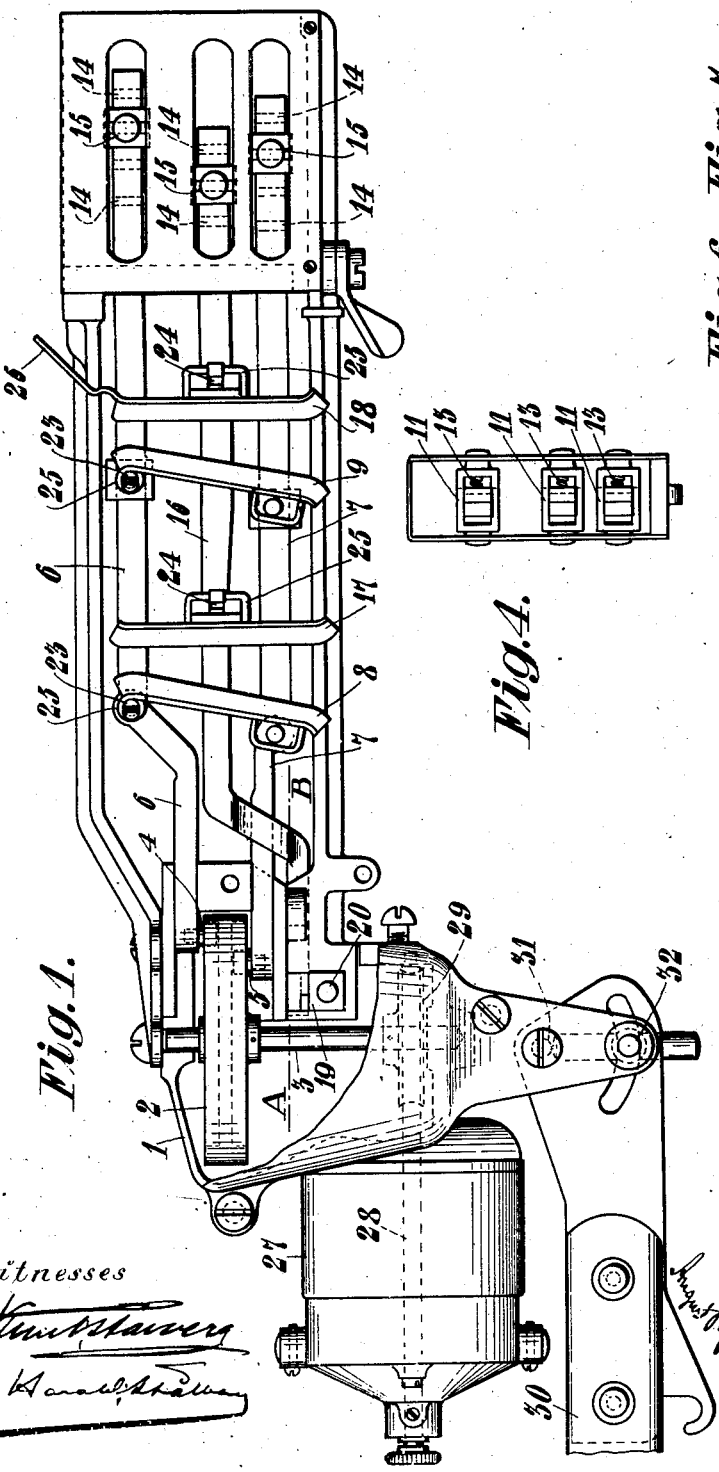

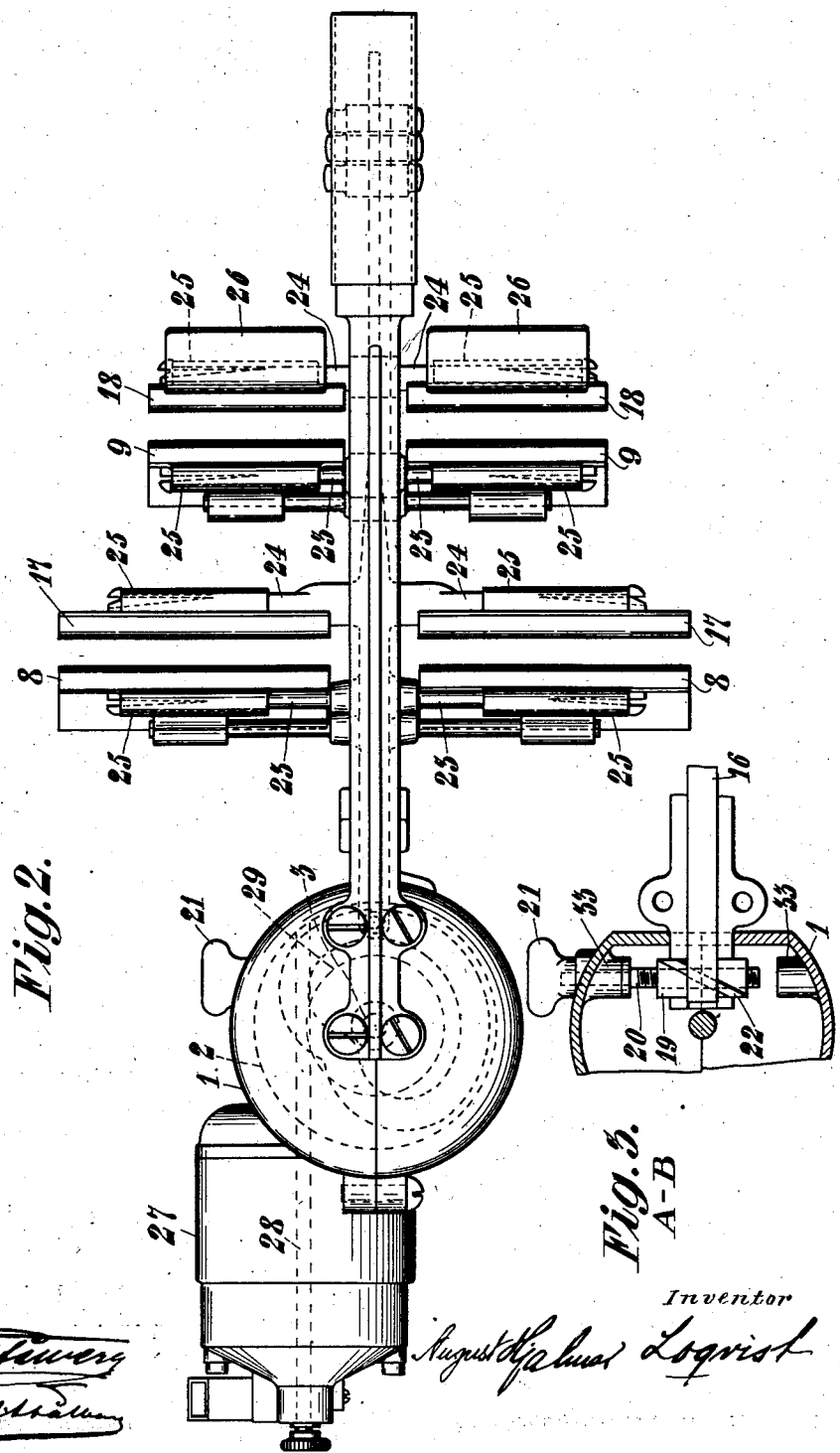

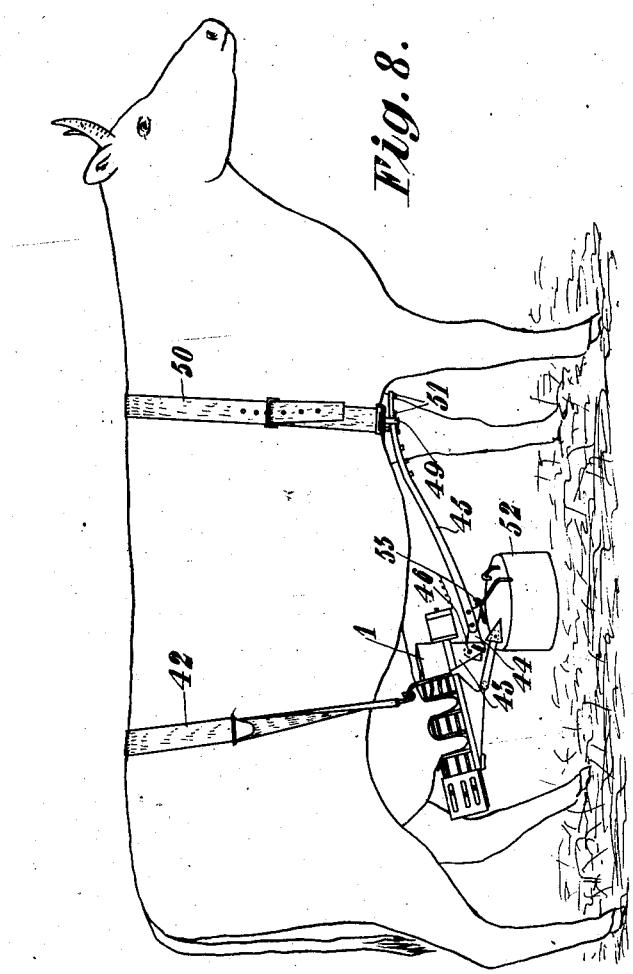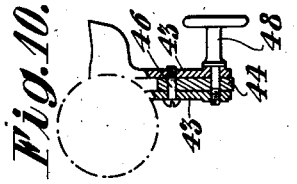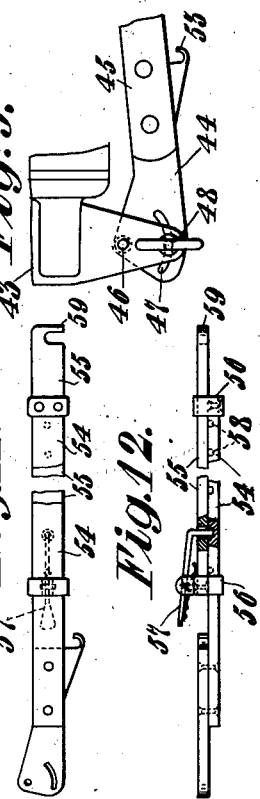

UNITED STATES PATENT OFFICE.

AUGUST HJALMAR LOQVIST, OF ESKILSTUNA, SWEDEN.

MILKING-MACHINE.

997,569.  Specification of Letters Patent.  Patented July 11, 1911.

Application filed October 28, 1910. Serial No. 589,553.

*To all whom it may concern:*

Be it known that I, AUGUST HJALMAR LOQVIST, a subject of the King of Sweden, residing at Eskilstuna, in the Kingdom of Sweden, have invented new and useful Improvements in Milking-Machines, of which the following is a specification, reference being had to the drawings accompanying and forming a part hereof.
This invention relates to milking machines of the kind in which the compressing members are supported by rods or the like connected to the driving device. In milking machines of this kind hitherto known the rod or the like carrying the stationary compressing members was placed below the rods or the like carrying the movable compressing members. In other words the stationary compressing members were attached at their lower ends to the members carrying the same. This has been found to be a drawback inasmuch as, when the teats are compressed, the upper edges of the stationary compressing members are liable to yield or swing about their lower ends.

One object of the invention is to remove the said drawback and provide a milking machine which is rigid and reliable in working.
Other objects of the invention will hereinafter appear.

The invention consists, chiefly, in that the rod or the like carrying the stationary compressing members has the part thereof next to the said members placed between the rods carrying the movable compressing members and, preferably, halfway between the said rous, so that the surporting points for the stationary compressing members will be placed at the middle of the same, whereby the said members will be entirely balanced for the pressure from within so that they will have no tendency to yield at any of their edges.
The invention further comprises means for adjusting the stationary compressing members in such a manner that the said adjustment will take place easily and rapidly and with great accuracy. To this end the member by which the rod is adjusted is movable at an angle to the rod so that the rod may be operated from the side of the machine.

The invention also comprises a supporting device for the machine by which the latter may be hung on the cow in such a manner that the machine will obtain the accurate and at the same time entirely firm position relatively to the udder which is a principal condition for a perfect working of the machine.

In the drawings, I have shown a machine embodying the invention.

Figure 1 is a side view and Fig. 2 is a plan view of the machine. Fig. 3 is a horizontal section on line A—B of Fig. 1. Fig. 4 is a rear view of the machine. Figs. 5 to 7 show a detail on an enlarged scale. Fig. 8 shows the supporting device during use. Fig. 9 is a side view on an enlarged scale of the device for adjusting the machine and the rod vertically relatively to each other. Fig. 10 is a rear view, partly in section, of the same device. Figs. 11 and 12 are side view and plan view, respectively, of a rod the length of which may be varied.

Referring to the drawings, the driving mechanism suitably consists of a cam-grooved disk 2 attached to an axle 3 journaled in the casing 1 (Figs. 1 and 2). Engaging the disk 2 are sliding rollers 4 and 5 attached to the operating rods 6 and 7, respectively, which carry the movable plates or compressing members 8 and 9. The plates 8 are connected to the rods 6 and 7 in such a manner that they cannot be moved along the same, whereas the plates 9 are journaled on rods 23 connected to rods 10 or the like (Figs. 5 to 7) adjustable in position along the rods 6 and 7. For locking the rods 10 in position the rods 6 and 7 are provided with sleeves 11 placed round about the two rods to be connected and forming a guide for a clamp 12 placed in the said sleeve. The clamp 12 is provided at one side with a press button 15 projecting outside the sleeve 11 and is normally kept by a spring 13 placed in the sleeve 11 in engagement with one or the other of a series of recesses 14 in the rod 6 or 7, respectively, by which the rod 10 is secured in position. When the rods 10 are to be adjusted, the button 15 is pressed in so that the clamp 12 is disengaged from the recess 14, whereupon the rod 10 may be moved along the rod 6 and secured in position by releasing the button 15 so that the spring 13 is free to press the clamp 12 into another recess 14.

The rod 16 carries the stationary compressing plates 17 and 18. According to the invention this rod is placed between the two operating rods 6 and 7. The plates 17 are connected to the rod 16 in such a manner as not to be movable along the same, whereas the plates 18 are adjustable in position on the said rod, to which end they may be connected to a device similar to that described, i. e. to a rod or the like movable along the rod 16 and adapted to be secured thereto in the manner described with reference to Figs. 5 to 7.

Placed below the forward end of the rod 16 movable in suitable guides is a slide 19 (Fig. 3) movable in guides in the casing 1, at an angle to the rod 16. Extending through the slide 19 is a screw 20 journaled in the casing 1 and provided, at the end thereof projecting laterally from the casing, with a handle 21. Projecting from the slide 19 is an obliquely extending cam 22 engaging a corresponding groove in the rod 16. When the screw 20 is turned, the slide 19 is moved correspondingly, and the obliquely extending cam thereby causes the rod 16 to move longitudinally.

By means of the mechanism described the milking members may be adjusted in the following manner. The plates 8 are first placed at the distance from the plates 17 corresponding to the distance between the teats in the longitudinal direction of the cow. During this operation the positions of the plates 8 and 9 remain unchanged. Thereupon the plates 9 are adjusted relatively to the plates 18. In order to thereupon regulate the pressure on the teats the plates 17 and 18 are displaced together relatively to the plates 8 and 9, which is performed by moving the rod 16 longitudinally by means of the screw 20. In order to prevent too strong a pressure on the teats, abutment pieces 33 are placed at the inner side of the casing 1, one at each end of the slide. These abutment pieces limit the movement of the slide in both directions and thus also the movement of the rod 16.

As shown in Figs. 1 and 2, the compressing plates are placed on transverse rods 23 and 24 extending from the rods 6, 7 and 16. All these transverse rods are slitted, and the one part of each rod, which forms a spring tongue, is bent somewhat away from the other part. Placed on the said slitted rods are sleeves 25 attached to the compressing plates, said sleeves being held in position by the spring action of the slitted rods. By this means it is made possible to easily and rapidly remove the compressing plates when the machine is to be taken into pieces for cleansing or the compressing plates are to be exchanged.

When the rear teats are directed somewhat forwardly, as is often the case, the part of the udder just behind the teats is liable to hang down exerting a pull on the teats so that the latter will easily disengage themselves from the compressing members. In order to prevent this, the rear compressing plates 18 are suitably provided with obliquely upward and downward extending parts 26 forming a support for the said part of the udder. Such extensions may also be used at the fore plates, or at all plates, if desired.

The machine is driven by an electric motor 27 whose casing is preferably made integral with the casing 1. The movement may be transmitted from the motor axle 28 to the axle 3 of the cam-grooved disk through a screw and wheel or otherwise.

The milking machine is supported in usual manner by a girdle 42 (Fig. 8) placed over the croup of the cow. At its forward end the machine is provided with two lugs 43. Placed between these lugs is a plate 44 attached to the rear end of a rod 45 extending forwardly below the belly of the cow. The plate 44 with the rod 45 is adapted to turn about a bolt or pivot pin 46 inserted through the said plate and the lugs 43. In the plate 44 is a slot 47 concentric with the bolt 46 and extending through the said slot is a screw 48 screwed into one of the lugs and bearing with a flange on the other one. By tightening the screw the plate 44 will thus be clamped between the lugs 43. The forward end of the rod 45 is inserted from behind through a clamp 49 or the like attached to a girdle 50. The rod is provided at its lower side with lugs or projections 51 placed at certain distances apart, said lugs forming between themselves recesses adapted to receive the clamp 49. The adjustment of the machine is suitably performed by first moving the rod 45 longitudinally into a position in which the machine is in proper position below the teats. The position of the machine may thereupon be adjusted by loosening the screw 48 and turning the machine relatively to the rod 45 so that the teats will hang freely between the compressing members of the machine. By tightening the screw 48 the machine is thereupon secured in position.

In the embodiment shown in Figs. 11 and 12, the rod consists of two parts 54, 55, movable through sleeves 56 each attached to one of the said rods. Attached to one of the said sleeves is a spring hook 57 extending through the one part 55 and projecting into one or the other of a series of cavities 58 in the other part 54. The rod may thus be extended or shortened by causing the hook 57 to engage one or the other cavity 58. At the forward end the rod has a hook 59 adapted to be placed in the clamp 49. Obviously, the rod may consist of more than two parts movable along one another.

It appears from the aforesaid that the adjustment is easily performed and requires only two simple manipulations, viz. moving the rod longitudinally (or lengthening or shortening same) and loosening and tightening the screw 48 in connection with a small turning of the machine. The adjustment will be the more simple as it may be performed entirely from the side of the machine without the person performing it changing his position.

The milk receptacle 52 is suitably carried by a hook 53 attached to the rod 45 (Figs. 8 and 9).

I claim:

1. In a milking machine, the combination of stationary compressing members, movable compressing members, means for driving said latter compressing members, operating rods connecting said driving means to said movable compressing members for transmitting movement thereto, and a supporting rod attached to the stationary compressing members at points lying between the said operating rods, substantially as and for the purpose set forth.

2. In a milking machine, the combination of stationary compressing members, movable compressing members, means for driving said latter compressing members, operating rods connecting said driving means to said movable compressing members for transmitting movement thereto, and an adjustable supporting rod attached to the stationary compressing members at points between the said operating rods, substantially as and for the purpose set forth.

3. In a milking machine, the combination of stationary compressing members, movable compressing members, means for driving said latter compressing members, operating rods connecting said driving means to said movable compressing members for transmitting movement thereto, and a longitudinally adjustable supporting rod attached to the stationary compressing members at points between the said operating rods, substantially as and for the purpose set forth.

4. In a milking machine, the combination of stationary compressing members, movable compressing members, means for driving said latter compressing members, operating rods connecting said driving means to said movable compressing members for transmitting movement thereto, a longitudinally adjustable supporting rod attached to the stationary compressing members at points between the said operating rods, and a part movable at an angle to the said supporting rod and operating thereon so as to adjust the same when shifted, substantially as and for the purpose set forth.

5. In a milking machine, the combination of stationary compressing members, movable compressing members, means for driving said latter compressing members, operating rods connecting said driving means to said movable compressing members for transmitting movement thereto, a longitudinally adjustable supporting rod for the stationary compressing members, and a slide movable at an angle to the said supporting rod and engaging the latter in such a manner as to shift the said rod when moved in either direction, substantially as and for the purpose set forth.

6. In a milking machine, the combination of stationary compressing members, movable compressing members, means for driving said latter compressing members, operating rods connecting said driving means to said movable compressing members for transmitting movement thereto, a longitudinally adjustable supporting rod for the stationary compressing members, and a slide movable at right angles to the said supporting rod and engaging the latter in such a manner as to shift the said rod when moved in either direction, substantially as and for the purpose set forth.

7. In a milking machine, the combination of stationary compressing members, movable compressing members, means for driving said latter compressing members, operating rods connecting said driving means to said movable compressing members for transmitting movement thereto, a longitudinally adjustable supporting rod for the stationary compressing members, a slide movable at an angle to the said supporting rod and engaging the latter in such a manner as to shift the said rod when moved in either direction, and a screw engaging the said slide so as to move the same when turned in either direction, substantially as and for the purpose set forth.

8. In a milking machine, the combination of stationary compressing members, movable compressing members, means for driving said latter compressing members, a casing inclosing the said driving means, operating rods connecting said driving means to said movable compressing members for transmitting movement thereto, a longitudinally adjustable supporting rod for the stationary compressing members, a slide movable at an angle to the said supporting rod and engaging the latter in such a manner as to shift the said rod when moved in either direction, and a screw journaled in the casing for the driving means and engaging the said slide so as to move the same when turned in either direction, said screw having a handle outside the said casing, substantially as and for the purpose set forth.

9. In a milking machine, the combination of stationary compressing members, movable compressing members, means for driving said latter compressing members, operating rods connecting said driving means to said movable compressing members for transmitting movement thereto, a longitudinally adjustable supporting rod for the stationary compressing members, a slide movable at an angle to the said supporting rod and engaging the latter in such a manner as to shift the said rod when moved in either direction, and abutments placed at the ends of the said slide for limiting its movement, substantially as and for the purpose set forth.

10. In a milking machine, the combination of stationary compressing members, movable compressing members, means for driving said latter compressing members, operating rods connecting said driving means to said movable compressing members for transmitting movement thereto, a longitudinally adjustable supporting rod for the stationary compressing members, a slide movable at right angles to the said supporting rod and engaging the latter in such a manner as to shift the said rod when moved in either direction, and abutments placed at the ends of the said slide for limiting its movement, substantially as and for the purpose set forth.

11. In a milking machine, the combination of stationary compressing members, movable compressing members, means for driving said latter compressing members, operating rods connecting said driving means to said movable compressing members for transmitting movement thereto, a longitudinally adjustable supporting rod for the stationary compressing members, a slide movable at an angle to the said supporting rod and engaging the latter in such a manner as to shift the said rod when moved in either direction, a screw engaging the said slide so as to move the same when turned in either direction, and abutments at the ends of the said slide for limiting its movement, substantially as and for the purpose set forth.

12. In a milking machine, the combination of a driving mechanism, operating rods for transmitting movement from the said driving mechanism, transverse rods extending from the said operating rods, a stationary rod, transverse rods extending from the said stationary rod, all said transverse rods being slitted and having the parts at both sides of the slit springy away from each other, and compressing members having sleeves adapted to be placed on the said transverse rods, said members being kept in position on the said rods by the spring action exerted on the same, substantially as and for the purpose set forth.

13. In a milking machine, the combination of stationary compressing members, movable compressing members, means for driving said latter compressing members, operating rods connecting said driving means to said movable compressing members for transmitting movement thereto, and a supporting rod for the stationary compressing members, the rear compressing members being provided with obliquely upwardly and rearwardly directed extensions forming a support for the udder, substantially as and for the purpose set forth.

14. In a milking machine, the combination of stationary compressing members the rear of which are provided with obliquely upwardly and rearwardly directed extensions forming a support for the udder, movable compressing members coöperating with the former, means for driving said latter compressing members, operating rods connecting said driving means to said movable compressing members for transmitting movement thereto, and a supporting rod for the said stationary compressing members, substantially as and for the purpose set forth.

15. In a milking machine, the combination of a frame, driving means carried by the said frame, stationary compressing members, movable compressing members, connections between the driving means and the said movable compressing members for transmitting movement to the same, and a rod connected to the frame of the machine in such a manner as to be adjustable vertically in relation thereto, said rod extending below the belly of the cow in position to be attached to the cow at its forward end, substantially as and for the purpose set forth.

16. In a milking machine, the combination of a frame, driving means carried by the said frame, stationary compressing members, movable compressing members, connections between the driving means and the said movable compressing members for transmitting movement to the same, and a longitudinally adjustable rod extending from the frame of the machine below the belly of the cow in position to be attached to the cow at its forward end, substantially as and for the purpose set forth.

17. In a milking machine, the combination of a frame, driving means carried by the said frame, stationary compressing members, movable compressing members, connections between the driving means and the said movable compressing members for transmitting movement to the same, and a longitudinally adjustable rod connected to the frame of the machine in such a manner as to be adjustable vertically in relation thereto, said rod extending below the belly of the cow in position to be attached to the cow at its forward end, substantially as and for the purpose set forth.

18. In a milking machine, the combination of a frame, driving means carried by the said frame, stationary compressing members, movable compressing members, connections between the driving means and the said movable compressing members for transmitting movement to the same, a rod connected to the frame of the machine in such a manner as to be adjustable vertically in relation thereto, said rod extending below the belly of the cow in position to be attached to the same at its forward end, and means comprising a set screw engaging a slot concentric to the turning point of said rod for locking same in position, substantially as and for the purpose set forth.

19. In a milking machine, the combination of a frame, driving means carried by the said frame, stationary compressing members, movable compressing members, connections between the driving means and the said movable compressing members for transmitting movement to the same, a rod connected to the frame of the machine in such a manner as to be adjustable vertically in relation thereto, said rod extending below the belly of the cow in position to be attached to the same at its forward end, and means for attaching the said rod to the cow at different points of the said rod.

20. In a milking machine, the combination of a frame, driving means carried by the said frame, stationary compressing members, movable compressing members, connections between the driving means and the said movable compressing members for transmitting movement to the same, and a rod connected to the frame of the machine in such a manner as to be adjustable vertically in relation thereto, said rod extending below the belly of the cow in position to be attached to the same, the forward part of the said rod having a number of recesses each of which is adapted to receive a clamp connected to a girdle in such a position as to allow the rod to be adjusted therein, substantially as and for the purpose set forth.

AUGUST HJALMAR LOQVIST.

Witnesses:
   Aug. Sörensen,
   Karl Runeskog.